(12) United States Patent
Kitago

(10) Patent No.: US 8,564,592 B2
(45) Date of Patent: Oct. 22, 2013

(54) IMAGE PROCESSING APPARATUS AND IMAGE PROCESSING METHOD

(75) Inventor: Masaki Kitago, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 13/060,931

(22) PCT Filed: Oct. 7, 2009

(86) PCT No.: PCT/JP2009/067819
§ 371 (c)(1),
(2), (4) Date: Feb. 25, 2011

(87) PCT Pub. No.: WO2010/061692
PCT Pub. Date: Jun. 3, 2010

(65) Prior Publication Data
US 2011/0148872 A1    Jun. 23, 2011

(30) Foreign Application Priority Data

Nov. 25, 2008  (JP) .................................. 2008-300183

(51) Int. Cl.
*G06T 19/00* (2011.01)
(52) U.S. Cl.
USPC ........................................................ 345/419
(58) Field of Classification Search
USPC ........... 345/419, 502, 653, 664, 679; 473/418
See application file for complete search history.

(56) References Cited

U.S. PATENT DOCUMENTS

| | | | |
|---|---|---|---|
| 5,915,046 A | 6/1999 | Echigo et al. | |
| 6,038,258 A * | 3/2000 | Chun et al. | 375/240.12 |
| 6,271,861 B1 | 8/2001 | Sargent et al. | |
| 6,313,840 B1 * | 11/2001 | Bilodeau et al. | 345/423 |
| 7,200,532 B1 * | 4/2007 | Cheng | 703/2 |
| 2007/0098296 A1 * | 5/2007 | Souchard | 382/275 |
| 2008/0278479 A1 * | 11/2008 | Sun et al. | 345/419 |

FOREIGN PATENT DOCUMENTS

| | | |
|---|---|---|
| JP | 10-320585 A | 12/1998 |
| JP | 11-345347 A | 12/1999 |
| JP | 3764765 B2 | 4/2006 |

OTHER PUBLICATIONS

Naouai, M.; Narjess, M.; Hamouda, A.; , "Line recognition algorithm using Constrained Delaunay Triangulation," ELMAR, 2010 Proceedings , vol., No., pp. 51-56, Sep. 15-17, 2010.*

B. Price, et al., "Object-based vectorization for interactive image editing", In Proceedings of Pacific Graphics 2006, vol. 22, No. 9-11, pp. 661-670.

(Continued)

*Primary Examiner* — Ke Xiao
*Assistant Examiner* — Wei-Wei Sun
(74) *Attorney, Agent, or Firm* — Fitzpatrick, Cella, Harper & Scinto

(57) ABSTRACT

This invention is directed to provide a technique for efficiently, optimally deciding the shape and number of meshes when performing mesh coding for an object having a gradation. This invention is also directed to provide a technique for setting representative points to minimize the mesh distortion. A mesh generation unit divides an object area into a plurality of meshes and obtains position information, gradient information, and color information for each vertex of a mesh. A mesh control unit decides unnecessary vertices based on the difference between color information of each vertex and color information in the object area that corresponds to the vertex. An optimization unit obtains position information, gradient information, and color information of necessary vertices to minimize the difference between color information of each necessary vertex other than the unnecessary vertices and color information at a position in the object area that corresponds to the necessary vertex.

20 Claims, 10 Drawing Sheets

(56) References Cited

OTHER PUBLICATIONS

J. Sun, et al., "Image Vectorization using Optimized Gradient Meshes", In proceedings of SIGGRAPH 2007, vol. 26, No. 3, 7 pgs.

L. Demaret et al., "Image Compression of Linear Splines over Adaptive Triangulations", online document, http://en.scientific commos.org/43291806, 2006, pp. 1-23.

International Search Report and Written Opinion dated Dec. 22, 2009 in PCT/JP2009/067819.

\* cited by examiner $$E(M) = \sum_{p=1}^{P}\sum_{u,v} \|I_p(m(u,v)) - f_p(u,v)\|^2$$
$$+ \sum_{p=1}^{P}\sum_{s,t}\left[\|m(s-\Delta s, t) - 2m(s,t) + m(s+\Delta s, t)\|^2\right.$$
$$\left.+ \|m(s, t-\Delta t) - 2m(s,t) + m(s, t+\Delta t)\|^2\right]$$

IMAGE PROCESSING APPARATUS AND IMAGE PROCESSING METHOD

TECHNICAL FIELD

The present invention relates to a mesh coding technique.

BACKGROUND ART

Resolution-free representations of illustrations and texts have conventionally used a method of approximating the contour of an object by a Bezier function, spline function, or the like. This method achieves high-speed processing and is popular, but is not good at a complicated gradation representation.

Rendering a resolution-free object containing a complicated gradation generally adopts a gradient mesh tool available from Adobe Illustrator®. A gradient mesh can render a complex object by giving a color and gradient to a mesh to generate a cubic function (patent references 1 and 2).

For a resolution-free representation of an object containing a complicated gradation, several methods are proposed to approximate an image using a mesh.

For example, there are a method of approximating an image using triangular patches (patent reference 3), and a method of subdividing Bezier patches to reduce an approximation error (non-patent reference 1). There is also proposed a method for implementing a resolution-free representation at a smaller number of meshes by solving an optimization problem and creating a gradient mesh (non-patent reference 2).

[Prior Art References]
[Patent References]
[Patent Reference 1] Japanese Patent Laid-Open No. 11-345347
[Patent Reference 2] Japanese Patent Laid-Open No. 10-320585
[Patent Reference 3] Japanese Patent No. 03764765
[Non-Patent References]
[Non-patent Reference 1] Brian Price, William Barrett, "Object-based vectorization for interactive image editing", In proceedings of Pacific Graphics 2006, 2006, vol. 22, No. 9-11, pp. 661-670.
[Non-patent Reference 2] Jian Sun, Lin Liang, Fang Wen, Heung-Yeung Shum, "Image Vectorization using Optimized Gradient Meshes", In proceedings of SIGGRAPH 2007, 2007, vol. 26, No. 3.

The method of approximating an image using triangular patches suffers a problem in the boundary representation of an object. When the object boundary is a smooth curve, it is difficult to express the curve by a linear mesh faithfully, and the faithful approximation requires many meshes. A high-order mesh is necessary to approximate a complicated boundary using a smaller number of meshes.

The method of subdividing Bezier patches to reduce an approximation error uses a high-order mesh and can faithfully approximate an object boundary. However, the subdivision of a mesh to reduce an approximation error increases the number of meshes and the data amount at a portion where the object color changes complicatedly.

The method of solving an optimization problem and creating a gradient mesh can provide a resolution-free representation with a smaller number of meshes even at an object boundary and a portion where the object color changes complicatedly. According to this method, however, the user needs to decide representative points in mesh generation and the number of meshes in mesh control in a processing sequence. Hence, this method cannot be employed readily. If representative points and the number of meshes are not set appropriately, a mesh satisfactory for the image quality, data amount, and calculation time cannot be generated.

Representative points can be decided by the method proposed in patent reference 1. However, this method takes a long processing time owing to repetitive mesh editing to approximate an object.

The processing sequence to generate a gradient mesh includes roughly four processes: 1. object input, 2. mesh generation, 3. mesh control, and 4. optimization. Two concrete problems will be described below.

In mesh generation, four representative points need to be decided. The first problem is adverse effect of the positions of the four representative points on the image quality. In general, the image quality is high with a less distorted mesh. To generate a mesh which hardly distorts, representative points are desirably decided at positions containing the object.

In mesh control, the number of meshes selected in accordance with the feature of an object influences the image quality, data amount, and calculation time, which is the second problem. A larger number of meshes generally improve the image quality, but leads to a larger data amount and longer calculation time. Efficient mesh control can be done as follows: a large number of meshes are arranged at a characteristic portion of an object to improve the image quality; and a small number of meshes are arranged at a less characteristic portion to reduce the data amount and calculation time while suppressing degradation of the image quality.

DISCLOSURE OF INVENTION

The present invention has been made to solve the conventional drawbacks, and provides a technique for efficiently, optimally deciding the shape and number of meshes when performing mesh coding for an object having a gradation.

Furthermore, the present invention provides a technique for setting representative points to minimize the mesh distortion.

According to the first aspect of the present invention, an image processing apparatus, comprising: a unit which extracts an area of an object, as an object area, from an image; a division unit which divides the object area into a plurality of meshes and calculates, for each of the respective meshes, position information, gradient information, and color information for each vertex of the mesh; a decision unit which decides unnecessary vertices based on a difference between color information of the respective meshes and color information in areas, in the object area, corresponding to the respective meshes; and a calculation unit which sets, as necessary vertices, vertices other than the unnecessary vertices, and decides position information, gradient information, and color information of the necessary vertices by performing iterative calculation to change the position information, gradient information, and color information of the necessary vertices so as to minimize a difference between color information of meshes defined by the unnecessary vertices and color information of areas, in the object area, corresponding to the meshes defined by the unnecessary vertices.

According to the second aspect of the present invention, an image processing method to be performed by an image processing apparatus, comprising: a step of extracting an area of an object, as an object area, from an image; a division step of dividing the object area into a plurality of meshes and calculating, for each of the respective meshes, position information, gradient information, and color information for each vertex of the mesh; a decision step of deciding unnecessary vertices based on a difference between color information of of the respective meshes and color information in areas, in the object area, corresponding to the respective meshes; and a calculation step of setting, as necessary vertices, vertices other than the unnecessary vertices, and deciding position information, gradient information, and color information of the necessary vertices by performing iterative calculation to change the position information, gradient information, and color information of the necessary vertices so as to minimize a difference between color information of meshes defined by the unnecessary vertices and color information of areas, in the object area, corresponding to the meshes defined by the unnecessary vertices.

Further features of the present invention will become apparent from the following description of exemplary embodiments with reference to the attached drawings.

BEST MODE FOR CARRYING OUT THE INVENTION

The embodiments of the present invention will now be described in detail with reference to the accompanying drawings.

[First Embodiment]

Figure 1:
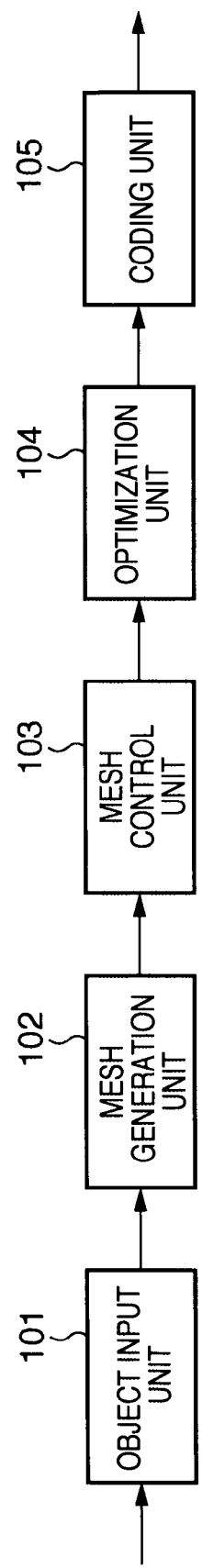
FIG. 1 is a block diagram exemplifying the functional arrangement of an image processing apparatus according to the first embodiment of the present invention.

FIG. 1 is a block diagram exemplifying the functional arrangement of an image processing apparatus according to the first embodiment. As shown in FIG. 1, the image processing apparatus according to the first embodiment includes an object input unit 101, mesh generation unit 102, mesh control unit 103, optimization unit 104, and coding unit 105.

The object input unit 101 receives an input image containing at least one object. The "object" means a text, object image, and the like. The embodiment assumes that the "object" has a color gradation. That is, a purpose of the embodiment is to perform mesh coding for an object having a color gradation.

Figure 3:
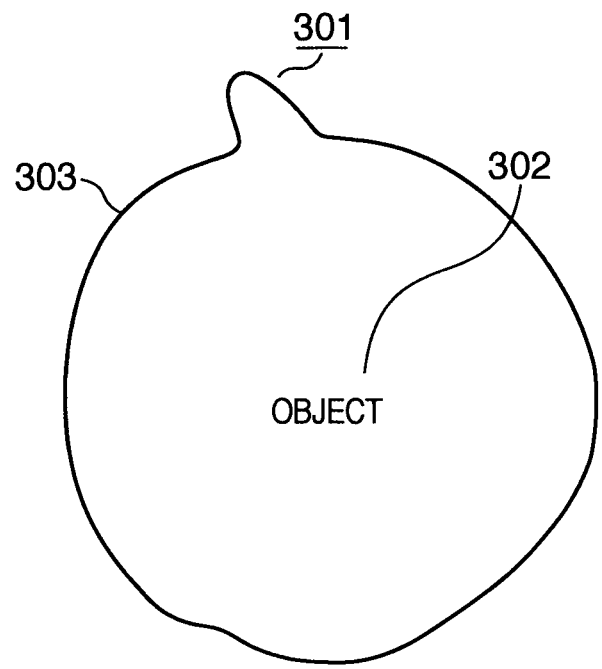
FIG. 3 is a view exemplifying an extracted object area.

The object input unit 101 extracts the area of an object as an object area from the input image. FIG. 3 is a view exemplifying an extracted object area. Data of the extracted object area contains the coordinate positions, on an input image, of pixels which form a boundary 303 of an object area 301, and pixel value data of pixels which form an inside 302 of the object area 301. In the embodiment, the pixel value is given by 8 bits for each of R, G, and B color components. However, the types of color components and the number of bits which form one color component are not limited to them. The object area may have another data structure as long as the coordinate positions of pixels which form the boundary of an object area and the pixel values of pixels which form the inside of the object area can be derived.

The object input unit 101 sends data of the extracted object area to the subsequent mesh generation unit 102.

Figure 2:
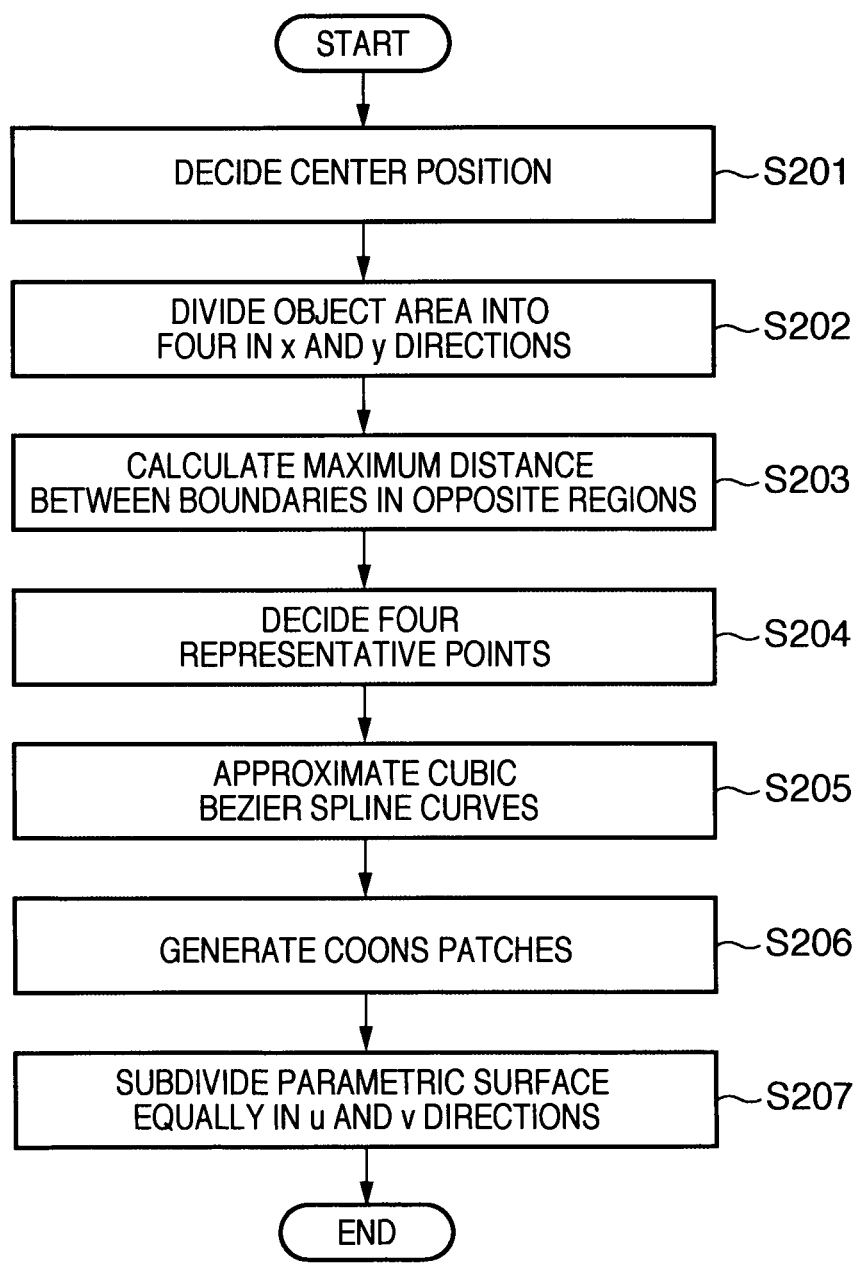
FIG. 2 is a flowchart of processing executed by a mesh generation unit 102 using object area data.

FIG. 2 is a flowchart of processing executed by the mesh generation unit 102 using object area data.

In step S201, the mesh generation unit 102 calculates a reference position in the object area using the coordinate positions of pixels which form the boundary of the object area. In the embodiment, the barycentric position (center position) of the object area is attained as the reference position. As a matter of course, the reference position in the object area is not limited to the center position, and the processing to calculate the center position is not limited to this.

In step S202, the mesh generation unit 102 sets, in the object area, two axes (x- and y-axes) which are perpendicular to each other at the center position calculated in step S201. Then, the mesh generation unit 102 divides the object area into four by the two axes, that is, sets four divided regions.

Figure 4:
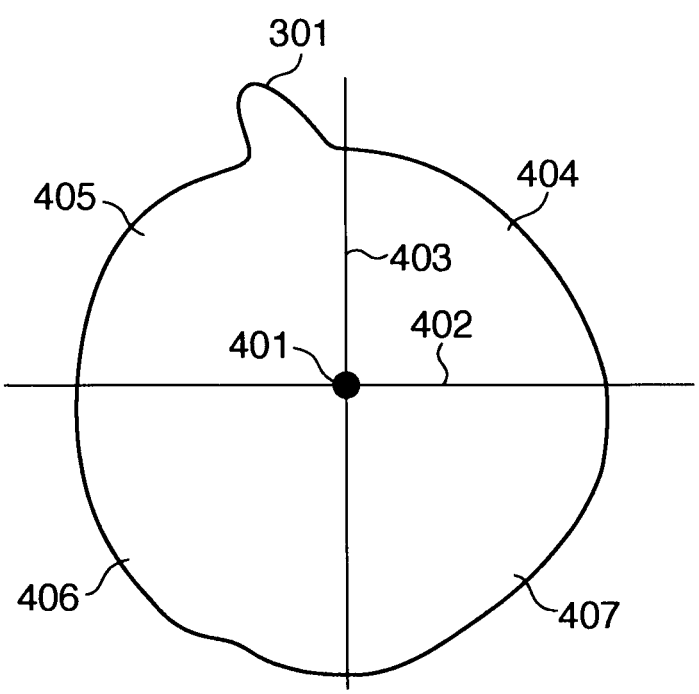
FIG. 4 is a view for explaining processes in steps S201 and S202.

FIG. 4 is a view for explaining the processes in steps S201 and S202. In FIG. 4, a center position 401 is one calculated in step S201. Two axes 402 and 403 are perpendicular to each other at the center position 401 and are along the x- and y-axes of an input image, respectively. By setting the two axes 402 and 403, the object area 301 is divided into divided regions 404, 405, 406, and 407.

Referring back to FIG. 2, in steps S203 and S204, the mesh generation unit 102 sets representative points on boundaries in the respective divided regions so that the distances between representative points in opposite divided regions are maximized.

Figure 5:
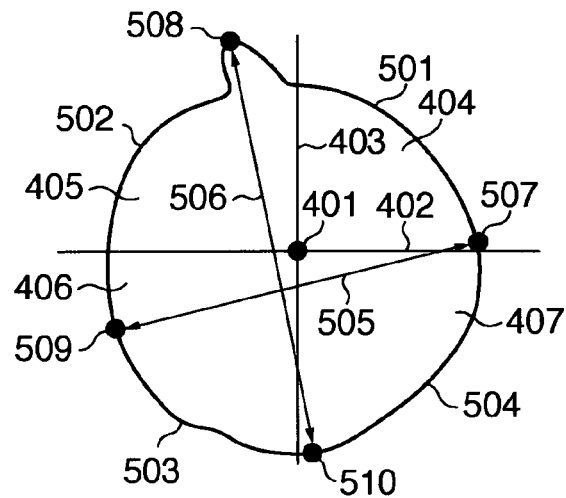
FIG. 5 is a view for explaining processes in steps S203 and S204.

FIG. 5 is a view for explaining the processes in steps S203 and S204. In FIG. 5, reference numeral 501 denotes a boundary in the divided region 404; 502, that in the divided region 405; 503, that in the divided region 406; and 504, that in the divided region 407.

The mesh generation unit 102 sets a representative point on the boundary 501 in the divided region 404 and a representative point on the boundary 503 in the divided region 406 opposite to the divided region 404. At this time, the mesh generation unit 102 decides the positions of the respective representative points to maximize the distance between the representative points. As a result, a representative point 507 is set as the representative point on the boundary 501, and a representative point 509 is set as one on the boundary 503, as shown in FIG. 5.

Similarly, the mesh generation unit 102 sets a representative point on the boundary 502 in the divided region 405 and a representative point on the boundary 504 in the divided region 407 opposite to the divided region 405. At this time, the mesh generation unit 102 decides the positions of the respective representative points to maximize the distance between the representative points. Consequently, a representative point 508 is set as the representative point on the boundary 502, and a representative point 510 is set as one on the boundary 504, as shown in FIG. 5.

These processes can set one representative point in each divided region, arranging four representative points uniformly.

Referring back to FIG. 2, in step S205, the mesh generation unit 102 calculates a cubic Bezier spline curve (parametric curve) connecting adjacent representative points. The mesh generation unit 102 performs this processing between the respective representative points, attaining four cubic Bezier spline curves.

The shape of the boundary of the object area can be approximated using the cubic Bezier spline curves.

In step S206, the mesh generation unit 102 generates Coons patches from the four cubic Bezier spline curves attained in step S205, calculating one parametric surface from the four cubic Bezier spline curves.

Figure 6:
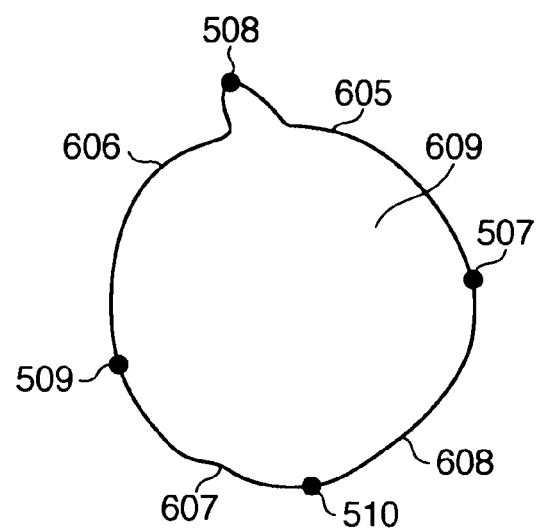
FIG. 6 is a view for explaining processes in steps S205 and S206.

FIG. 6 is a view for explaining the processes in steps S205 and S206.

Referring to FIG. 6, a cubic Bezier spline curve 605 connects the representative points 507 and 508. A cubic Bezier spline curve 606 connects the representative points 508 and 509. A cubic Bezier spline curve 607 connects the representative points 509 and 510. A cubic Bezier spline curve 608 connects the representative points 510 and 507.

After calculating the four cubic Bezier spline curves in step S205, the mesh generation unit 102 represents a region surrounded by the four cubic Bezier spline curves as a parametric surface using Coons patches, thereby calculating a parametric surface 609. This processing is a well-known technique, and a description thereof will be omitted.

Referring back to FIG. 2, in step S207, the mesh generation unit 102 divides the parametric surface calculated in step S206 equally in the u and v directions, generating an initial mesh. More specifically, points on the parametric surface are sampled two-dimensionally in the u and v directions, and the parametric surface (object area) is divided into meshes each defined by four sampled points. For each vertex which constructs a mesh, position information representing the position of the vertex, gradient information at the position, and color information at the position are attained upon the division processing.

To efficiently perform subsequent optimization processing, an initial mesh is desirably generated at a position close to an optimum mesh. It is also desired to adaptively arrange meshes in accordance with the feature of an image.

Figure 7:
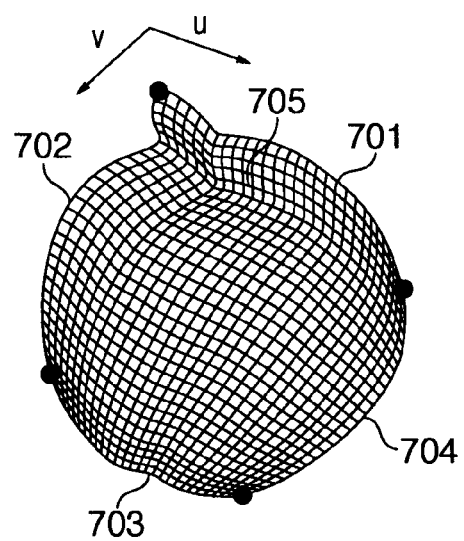
FIG. 7 is a view for explaining a process in step S207.

FIG. 7 is a view for explaining the process in step S207. In FIG. 7, cubic Bezier spline curves 701 and 703 run in the u direction (i.e., direction defined by the parametric surface), and cubic Bezier spline curves 702 and 704 run in the v direction (i.e., direction defined by the parametric surface). In this case, points on the parametric surface are sampled two-dimensionally in the u and v directions. The parametric curve is divided into meshes each defined by four sampled points, generating an initial mesh 705. That is, the parametric surface is divided into a plurality of meshes.

The parametric surface is expressed by a parameter which takes a value of 0 to 1 in each of the u and v directions. For example, when dividing the parametric surface into 10, "divide equally" means sampling points at respective positions set by changing the parameter in steps of 0.1. The division number may be set arbitrarily. In FIG. 7, the division number is set to 30 in both the u and v directions.

Figure 8:
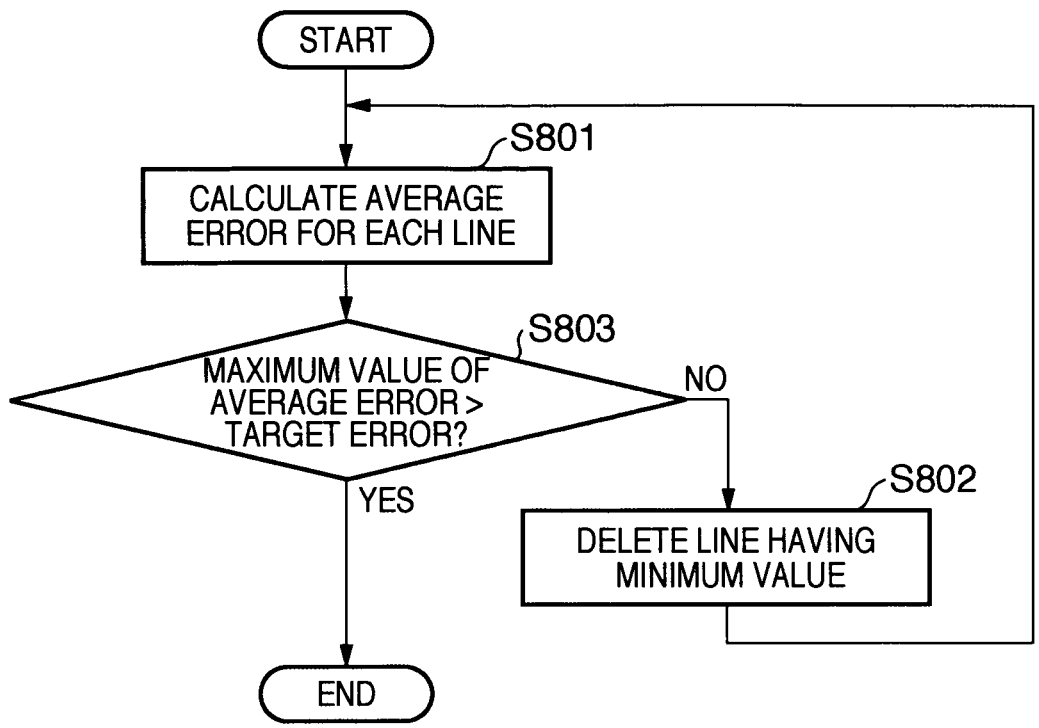
FIG. 8 is a flowchart of processing executed by a mesh control unit 103.

After the mesh generation unit 102 performs the above-described processes, the mesh control unit 103 starts processing according to a flowchart shown in FIG. 8.

FIG. 8 is a flowchart of processing executed by the mesh control unit 103. The processing based on the flowchart shown in FIG. 8 is done in each of the u and v directions. Processes for the u and v directions are the same, and that for the u direction will be exemplified. The following description also applies to processing in the v direction.

In step S801, the mesh control unit 103 refers to vertices calculated in step S207 for each line in the u direction. Then, the mesh control unit 103 specifies meshes (meshes aligned in the u direction) defined by vertices forming the referred line (reference line) and vertices forming a line (adjacent line) adjacent to the reference line. For each specified mesh, the mesh control unit 103 calculates the difference (error) between color information of the mesh (color information calculated by interpolation from color information of vertices forming the mesh) and color information in the object area that corresponds to the mesh. The mesh control unit 103 calculates the average value (average error) of errors calculated for the respective meshes, attaining the average error of each line in the u direction.

In step S803, the mesh control unit 103 determines whether a maximum value (maximum average value) among average errors calculated in step S801 for the respective lines in the u direction is larger than a target error (specified value). If the maximum average value is equal to or smaller than the target error (specified value), the process advances to step S802.

In step S802, the mesh control unit 103 decides that vertices belonging to a line having a minimum average error (minimum average value) are unnecessary vertices. The mesh control unit 103 deletes position information, gradient information, and color information of the unnecessary vertices. The process then returns to step S801 to execute the following process for the remaining vertices.

As described above, the processing according to the flowchart shown in FIG. 8 is also done in the v direction, in addition to the u direction. As a result, unnecessary vertices can be decided in both the u and v directions.

Finally, the mesh control unit 103 reconstructs a parametric surface using vertices (vertices (necessary vertices) whose position information, gradient information, and color information are not deleted), other than unnecessary vertices.

Figure 9:
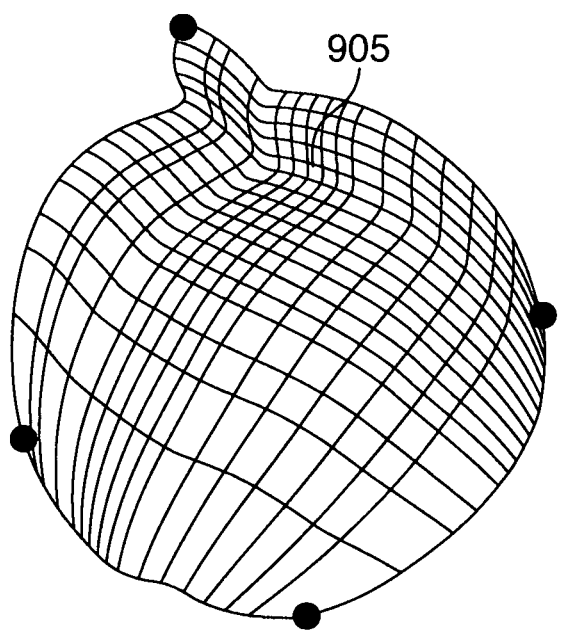
FIG. 9 is a view exemplifying a parametric surface obtained by executing the processing according to the flowchart shown in FIG. 8 for a parametric surface shown in FIG. 7 in both the u and v directions.

FIG. 9 is a view exemplifying a parametric surface obtained by executing the processing according to the flowchart shown in FIG. 8 for the parametric surface shown in FIG. 7 in both the u and v directions. As shown in FIG. 9, an adaptive initial mesh 905 is generated by deleting unnecessary vertices from the initial mesh 705.

After the mesh control unit 103 performs the above-described processes, the optimization unit 104 starts the following processing. More specifically, the optimization unit 104 optimizes the following pieces of information to minimize an error between a color in a mesh that is calculated from a plurality of meshes on the parametric surface reconstructed in the above-described way, and a color on the input image that corresponds to the position of the mesh:

position information (two-dimensional coordinates) of a mesh
    gradient information
    color information (RGB value)
    color gradient information.

Figure 10:
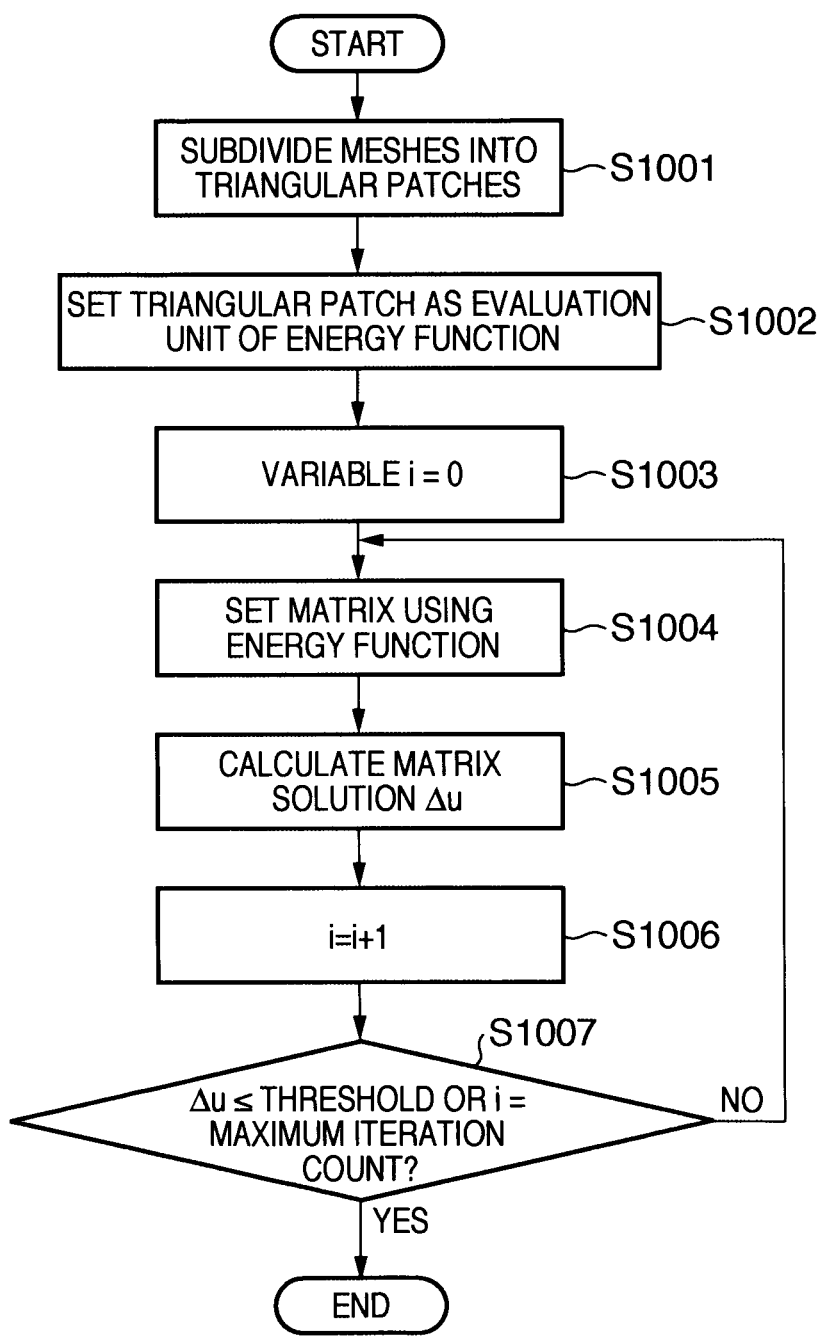
FIG. 10 is a flowchart of processing executed by an optimization unit 104.

The optimization processing is a well-known technique, so this technique will be explained in brief. FIG. 10 is a flowchart of processing executed by the optimization unit 104.

In step S1001, the optimization unit 104 subdivides each mesh into triangular patches by dividing it equally in the u and v directions. The division number can be set arbitrarily, and in this example, is set to 5 in both the u and v directions.

In step S1002, the optimization unit 104 sets the triangular patch as the evaluation unit of an energy function. The optimization precision is improved by calculating an optimization error not for each pixel but for each triangular patch.

In step S1003, the optimization unit 104 sets a variable i representing the iteration count.

In step S1004, the optimization unit 104 derives a matrix from the energy function.

Each element (scalar value) of the matrix is a numerical value calculated using all pieces of mesh information. Optimum mesh information is unknown, and mesh information having a minimum scalar value needs to be calculated by changing the mesh information to various values. More specifically, a matrix with a size corresponding to unknowns (number of mesh vertices×number of parameters to be changed) needs to be derived and calculated. Several methods are proposed to derive the matrix. In this example, the matrix is derived using a known method called a Levenberg-Marquardt method.

Figures 11, 12:
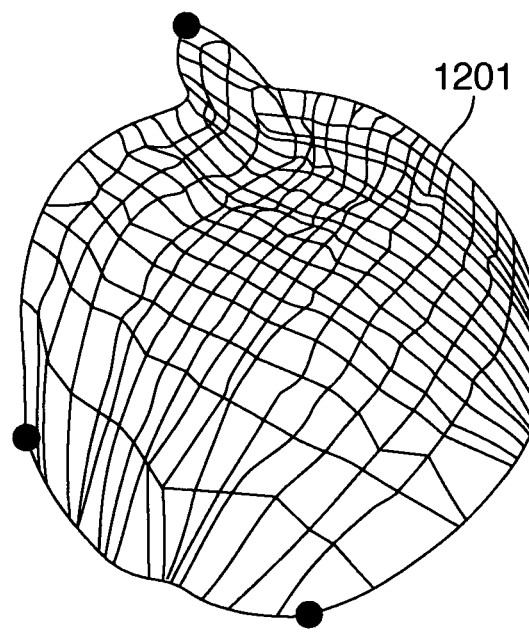
FIG. 11 is a view showing an energy function.
FIG. 12 is a view exemplifying a parametric surface obtained by performing the processing according to the flowchart shown in FIG. 10 for the parametric surface shown in FIG. 9.

FIG. 11 shows the equation of the energy function, where M is a gradient mesh formed from P object areas, u and v are parametric coordinates, p is an object area, $I_p$ is the color of an original image in the area p, m(u,v) is a coordinate point on the gradient mesh, $f_p(u,v)$ is the color of the gradient mesh in the area p, s and t be parametric coordinates, and λ is a balance with the first term. The matrix is derived by the Levenberg-Marquardt method. In this example, the unknowns are position information (two-dimensional coordinates) of a mesh (each vertex), gradient information of the mesh (each vertex), and color gradient information.

In step S1005, the optimization unit 104 calculates a solution Δu of simultaneous linear equations.

In step S1006, the optimization unit 104 increments by one the variable i representing the iteration count.

If the sum (mesh update amount) of the absolute values of Δu becomes equal to or smaller than a set threshold or i has reached a set maximum iteration count in step S1007, the process ends. If neither of the conditions is satisfied, the process returns to step S1004.

By this iterative calculation, position information (two-dimensional coordinates) of a mesh (each vertex), gradient information of the mesh (each vertex), color information (RGB value), and color gradient information are updated optimally (changed to minimize the energy function).

FIG. 12 is a view exemplifying a parametric surface obtained by performing the processing according to the flowchart shown in FIG. 10 for the parametric surface shown in FIG. 9. As shown in FIG. 12, a parametric surface 1201 is generated by updating the two-dimensional coordinates of the adaptive initial mesh 905, the gradient of a mesh (each vertex), and the color gradient to minimize the energy function.

The embodiment employs the Levenberg-Marquardt method for iterative calculation, but may use another method such as a Gauss-Newton method. The embodiment adopts the preconditioned biconjugate gradient method to calculate simultaneous linear equations in optimization processing, but may use another method such as LU decomposition or Cholesky decomposition. For easy calculation, color gradient information may not be handled as an unknown in calculation.

After the optimization unit 104 executes the above-described processes, the coding unit 105 codes and manages mesh data (calculation result) obtained by the aforementioned processes. The mesh data describes the contents of the following items as a text:

header including the number of vertices of a mesh in the u direction, that of vertices of a mesh in the v direction, and that of regions the x- and y-coordinates of the vertices of a mesh, gradients in the u and v directions, scale values in the u and v directions, RGB values, and color gradients in the u and v directions.

In the first embodiment, the coding unit 105 zips and manages mesh data serving as text data describing the contents of these items. The coding unit 105 may adopt another coding method including lossy coding.

As described above, the first embodiment can efficiently decide representative points in mesh generation and the shape and number of meshes in mesh control. The embodiment can achieve a higher image quality, smaller data amount, and shorter processing time.

<Modification>

The respective units shown in FIG. 1 may be formed from hardware but may also be implemented as software (computer program). In this case, the software is installed in the memory of a general computer such as a PC (Personal Computer). The CPU of the computer executes the installed software, and the computer provides the functions of the above-described image processing apparatus (the functions of the respective units shown in FIG. 1). That is, the computer is applicable to the foregoing image processing apparatus.

Figure 13:
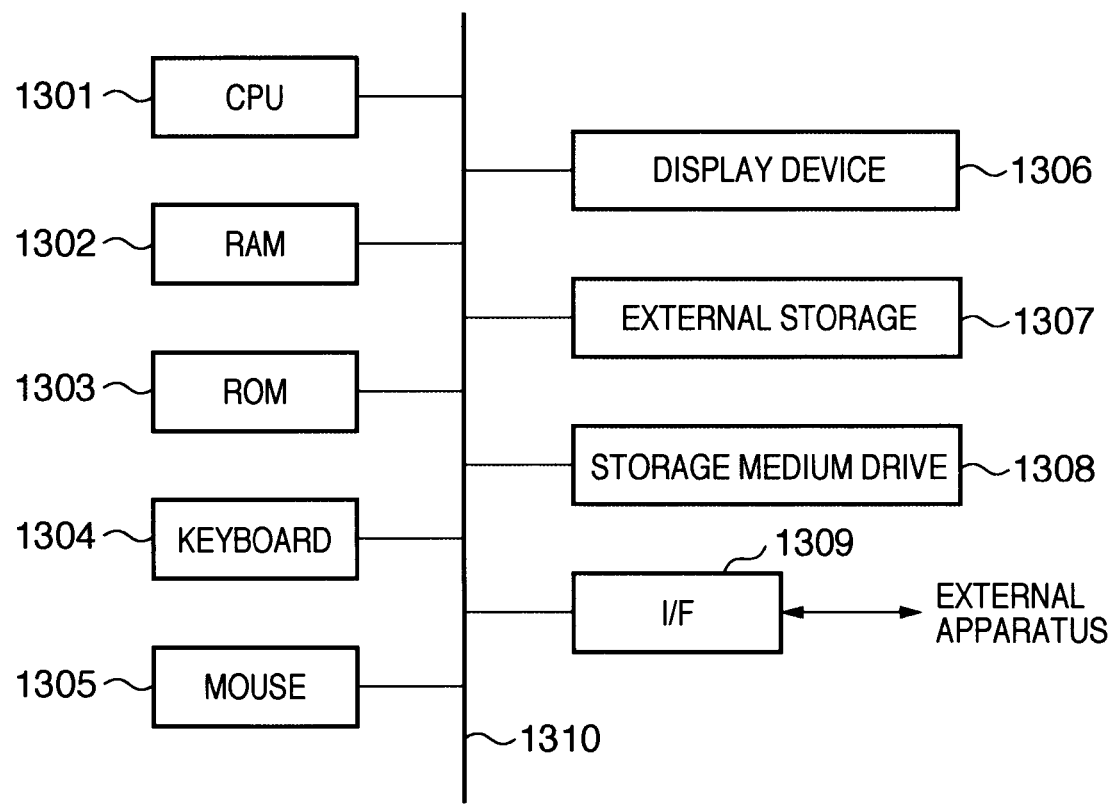
FIG. 13 is a block diagram exemplifying the hardware configuration of a computer applicable as the image processing apparatus according to the first embodiment of the present invention.

FIG. 13 is a block diagram exemplifying the hardware configuration of a computer applicable as the image processing apparatus according to the first embodiment.

A CPU 1301 controls the overall computer using computer programs and data stored in a RAM 1302 and ROM 1303. In addition, the CPU 1301 executes the processes described to be performed by the image processing apparatus. That is, the CPU 1301 executes the processes described to be executed by the respective units shown in FIG. 1.

The RAM 1302 has an area for temporarily storing computer programs and data loaded from an external storage 1307 and storage medium drive 1308, data received from an external apparatus via an I/F (interface) 1309, and the like. Further, the RAM 1302 has a work area used to execute various processes by the CPU 1301. The RAM 1302 can appropriately provide various kinds of areas.

The ROM 1303 stores computer set data, boot programs, and the like.

The user of the computer can operate a keyboard 1304 and mouse 1305 to input a variety of instructions to the CPU 1301.

A display device 1306 is formed from a CRT, liquid crystal display, or the like, and can display the result of processing by the CPU 1301 as an image, text, or the like. For example, the display device 1306 can display an input image as described above, explicitly display an extracted object area, and display a cubic Bezier spline curve, parametric surface, and the like obtained during mesh coding.

The external storage 1307 is a large-capacity information storage device typified by a hard disk drive. The external storage 1307 saves an OS (Operating System), computer programs and data for causing the CPU 1301 to implement the functions of the respective units shown in FIG. 1, input image data as described above, information described as known information, and the like. If necessary, the computer programs and data saved in the external storage 1307 are loaded into the RAM 1302 under the control of the CPU 1301 and processed by the CPU 1301.

The storage medium drive 1308 reads out computer programs and data stored in a storage medium such as a CD-ROM or DVD-ROM, and outputs the readout computer programs and data to the external storage 1307 or RAM 1302. Part of information described to be saved in the external storage 1307 may be stored in the storage medium and read by the storage medium drive 1308.

The I/F 1309 is used to connect an external apparatus to the computer. For example, an apparatus such as a digital camera for acquiring an input image as described above may be connected to the I/F 1309. In this case, an input image is acquired from the apparatus via the I/F 1309 into the RAM 1302 or external storage 1307.

A bus 1310 connects these units.

[Second Embodiment]

The first embodiment has described a method of dividing an object area into four and deciding four representative points in mesh generation. The four representative points are desirably arranged at positions containing the object area. According to the method of dividing an object area into four, four representative points are decided by calculating two straight lines each having a maximum distance in opposite regions. Generally when two straight lines have maximum distances and are perpendicular to each other, a generated mesh hardly distorts. However, in the four-division method capable of attaining maximum distances, two straight lines may be arranged almost parallel to each other.

The second embodiment will explain a method of dividing an object area into eight and deciding four representative points. The eight-division method does not guarantee a maximum distance but can prevent the almost parallel arrangement of two straight lines.

A difference of the second embodiment from the first embodiment will be mainly explained.

The functional arrangement of an image processing apparatus according to the second embodiment is the same as that in the first embodiment, that is, the arrangement shown in FIG. 1.

Figure 14:
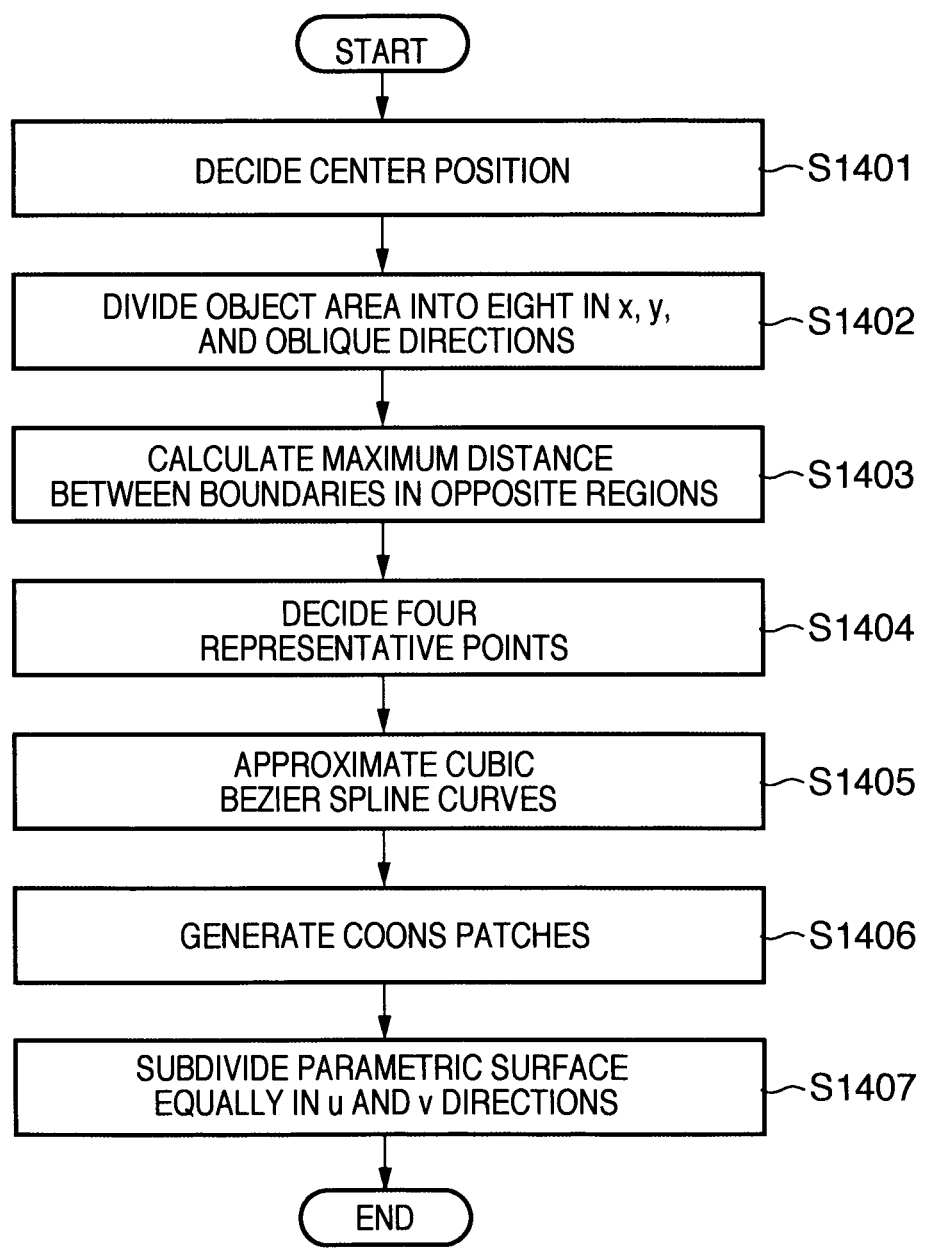
FIG. 14 is a flowchart of processing executed by the mesh generation unit 102.

A mesh generation unit 102 executes processing according to a flowchart shown in FIG. 14.

FIG. 14 is a flowchart of processing executed by the mesh generation unit 102.

In step S1401, the mesh generation unit 102 calculates a reference position in the object area using the coordinate positions of pixels which form the boundary of the object area. In the embodiment, the barycentric position (center position) of the object area is attained as the reference position. Needless to say, the reference position in the object area is not limited to the center position, and the processing to calculate the center position is not limited to this.

In step S1402, the mesh generation unit 102 sets, in the object area, two axes (x- and y-axes) which are perpendicular to each other at the center position calculated in step S1401, and two axes obtained by rotating these two axes (x- and y-axes) by 45° about the center position. Then, the mesh generation unit 102 divides the object area into eight by the four axes, that is, sets eight divided regions.

Figure 15:
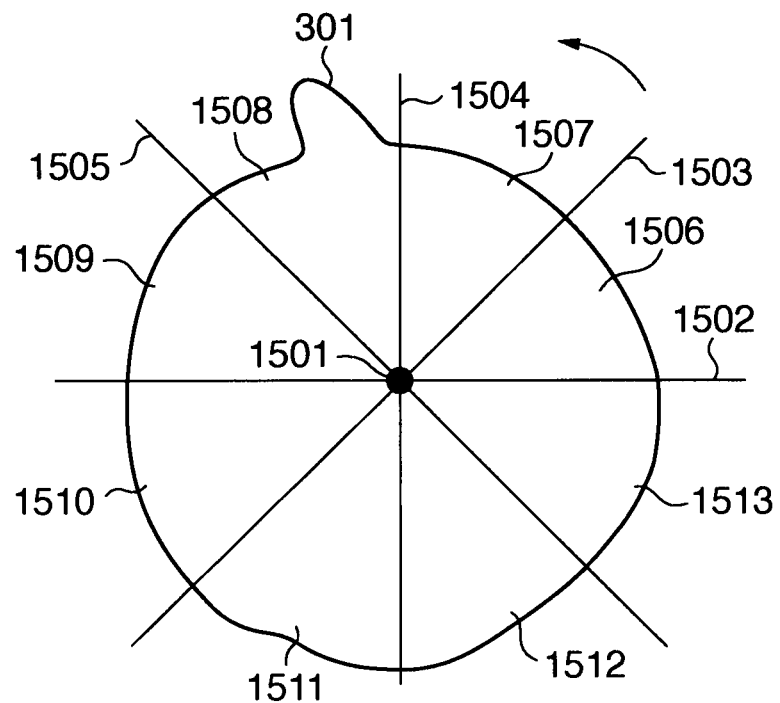
FIG. 15 is a view for explaining processes in steps S1401 and S1402.

FIG. 15 is a view for explaining the processes in steps S1401 and S1402. In FIG. 15, a center position 1501 is one calculated in step S1401. Two axes 1502 and 1504 are perpendicular to each other at the center position 1501 and are along the x- and y-axes of an input image, respectively. Two axes 1503 and 1505 are set by rotating the axes 1502 and 1504 by 45° about the center position 1501 in a direction indicated by an arrow in FIG. 15. By setting the four axes 1502, 1503, 1504, and 1505, an object area 301 is divided into divided regions 1506, 1507, 1508, 1509, 1510, 1511, 1512, and 1513.

Referring back to FIG. 14, in steps S1403 and S1404, the mesh generation unit 102 sets representative points on boundaries in the respective divided regions so that the distances between representative points in opposite divided regions are maximized. Then, the mesh generation unit 102 calculates the distances between representative points in opposite divided regions. The mesh generation unit 102 specifies two representative points exhibiting a maximum distance among the calculated distances. Further, the mesh generation unit 102 specifies two divided regions not adjacent to the two divided regions having the maximum distance, and specifies two representative points set in the two specified divided regions. Accordingly, four representative points can be specified.

Figure 16:
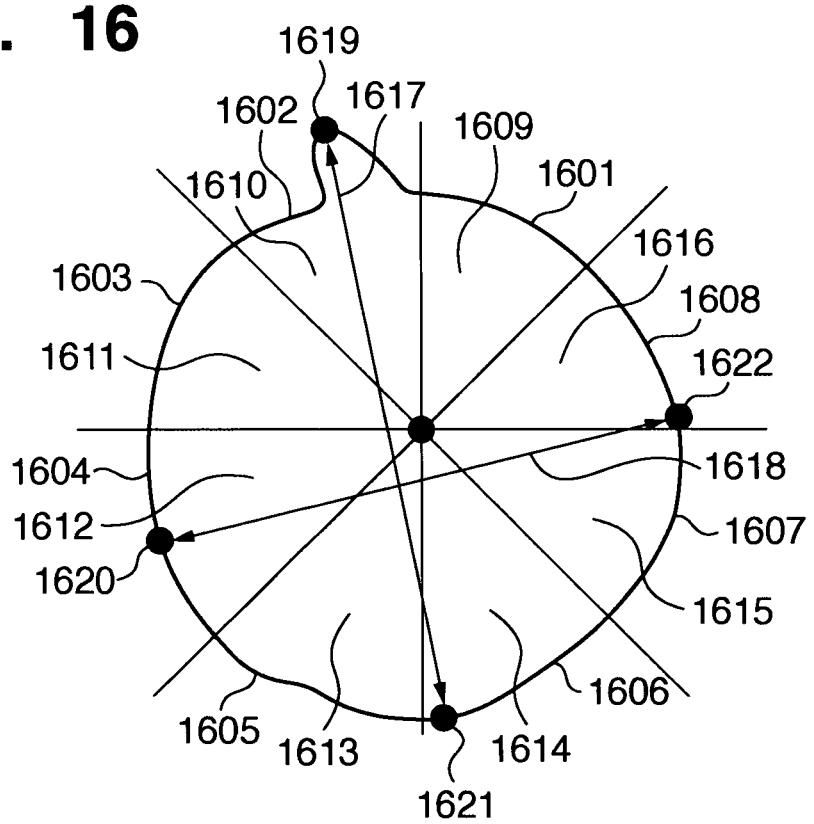
FIG. 16 is a view for explaining processes in steps S1403 and S1404.

FIG. 16 is a view for explaining the processes in steps S1403 and S1404.

In FIG. 16, reference numeral 1601 denotes a boundary in a divided region 1609; 1602, that in a divided region 1610; 1603, that in a divided region 1611; and 1604, that in a divided region 1612. Reference numeral 1605 denotes a boundary in a divided region 1613; 1606, that in a divided region 1614; 1607, that in a divided region 1615; and 1608, that in a divided region 1616.

The mesh generation unit 102 sets a representative point on the boundary in each divided region. The mesh generation unit 102 decides the positions of the respective representative points to maximize the distance between the representative points in opposite divided regions. The processing for each pair of opposite divided regions is the same as that in the first embodiment except for the number of divided regions. The mesh generation unit 102 calculates the distance between the representative points for each pair of opposite divided regions. The mesh generation unit 102 specifies two representative points exhibiting a maximum distance among the calculated distances.

In FIG. 16, two representative points having a maximum distance are two representative points 1619 and 1621. Reference numeral 1617 denotes a distance between these two representative points.

Next, the mesh generation unit 102 specifies the divided regions 1612 and 1616 not adjacent to the two divided regions 1610 and 1614 having the maximum distance. The mesh generation unit 102 specifies a representative point 1620 set in the divided region 1612 and a representative point 1622 set in the divided region 1616. Reference numeral 1618 denotes a distance between these two representative points.

These processes can set one representative point in each divided region, arranging four representative points uniformly. Subsequent processes do not use representative points except for these four specified representative points (the representative points 1619, 1620, 1621, and 1622 in FIG. 16).

In step S1405, the mesh generation unit 102 calculates a cubic Bezier spline curve (parametric curve) connecting adjacent representative points. The mesh generation unit 102 performs this processing between the respective representative points, attaining four cubic Bezier spline curves. The mesh generation unit 102 also calculates cubic Bezier spline curves connecting these four cubic Bezier spline curves.

The shape of the boundary of the object area can be approximated using the cubic Bezier spline curves.

In step S1406, the mesh generation unit 102 generates Coons patches from the four cubic Bezier spline curves attained in step S1405, calculating one parametric surface from the four cubic Bezier spline curves.

In step S1407, the mesh generation unit 102 divides the parametric surface calculated in step S1406 equally in the u and v directions, generating an initial mesh. More specifically, points on the parametric surface are sampled two-dimensionally in the u and v directions, and the parametric surface (object area) is divided into meshes each defined by four sampled points. For each vertex which constructs a mesh, position information representing the position of the vertex, gradient information at the position, and color information at the position are attained upon the division processing.

As described above, the remaining processes are the same as those in the first embodiment, and a description thereof will not be repeated.

A computer having the arrangement exemplified in FIG. 13 is also applicable to the image processing apparatus according to the second embodiment, as described above in the modification.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-300183, filed Nov. 25, 2008, which is hereby incorporated by reference herein in its entirety.

The invention claimed is:

1. An image processing apparatus, comprising:
a unit which extracts an area of an object, as an object area, from an image;
a division unit which divides the object area into a plurality of meshes and calculates, for each of the respective meshes, position information, gradient information, and color information for each vertex of the mesh;
a decision unit which decides unnecessary vertices based on a difference between color information of the respective meshes and color information in areas, in the object area, corresponding to the respective meshes; and
a calculation unit which sets, as necessary vertices, vertices other than the unnecessary vertices, and decides position information, gradient information, and color information of the necessary vertices by performing iterative calculations to change the position information, gradient information, and color information of the necessary vertices so as to minimize a difference between color information of meshes defined by the unnecessary vertices and color information of areas, in the object area, corresponding to the meshes defined by the unnecessary vertices,
wherein said division unit includes:
a unit which calculates a center position of the object area,
a unit which sets, in the object area, two axes that pass through the center position and are perpendicular to each other, thereby dividing the object area into four divided regions by the two axes,
a unit which sets representative points on boundaries in the respective divided regions to maximize a distance between two representative points on each pair of opposite divided regions,
a unit which calculates a curve connecting adjacent representative points for each pair of the adjacent representative points, thereby obtaining four curves,
a unit which calculates a surface, using the four curves, for a region surrounded by the four curves, and
a unit which samples points on the surface two-dimensionally in axial directions of two axes defined by the surface to divide the object area into meshes each defined by four points and calculate, for each of the respective meshes, position information, gradient information, and color information for each vertex of the mesh.

2. The apparatus according to claim 1, wherein the curve includes a cubic Bezier spline curve.

3. The apparatus according to claim 1, wherein the surface includes a Coons patch.

4. The apparatus according to claim 1, wherein said calculation unit performs iterative calculation using a Levenberg-Marquardt method.

5. The apparatus according to claim 1, further comprising a unit which encodes and manages a calculation result of said calculation unit.

6. A non-transitory computer-readable storage medium storing a computer program for causing a computer to function as units of an image processing apparatus defined in claim 1.

7. An image processing apparatus, comprising:
a unit which extracts an area of an object, as an object area, from an image;
a division unit which divides the object area into a plurality of meshes and calculates, for each of the respective meshes, position information, gradient information, and color information for each vertex of the mesh;
a decision unit which decides unnecessary vertices based on a difference between color information of the respective meshes and color information in areas, in the object area, corresponding to the respective meshes; and
a calculation unit which sets, as necessary vertices, vertices other than the unnecessary vertices, and decides position information, gradient information, and color information of the necessary vertices by performing iterative calculations to change the position information, gradient information, and color information of the necessary vertices so as to minimize a difference between color information of meshes defined by the unnecessary vertices and color information of areas, in the object area, corresponding to the meshes defined by the unnecessary vertices,
wherein said division unit includes:
a unit which calculates a center position of the object area,
a unit which sets, in the object area, two first axes that pass through the center position and are perpendicular to each other, and two second axes obtained by rotating the two first axes by 45° about the center position, thereby dividing the object area into eight divided regions by the four axes, a unit which performs processing, for each pair of opposite divided regions to set representative points on boundaries in the opposite divided regions, to maximize a distance between two representative points on each pair of opposite divided regions and to calculate a distance between two representative points on each pair of opposite divided regions, a specifying unit which specifies two representative points for which a maximum distance is calculated and two representative points for two divided regions, not adjacent to the two divided regions where the two representative points for which the maximum distance is calculated, are calculated, a unit which performs processing, for each pair of adjacent representative points specified by said specifying unit, to calculate a curve connecting the adjacent representative points, thereby obtaining four curves, a unit which calculates a surface, using the four curves, for a region surrounded by the four curves, and a unit which samples points on the surface two-dimensionally in axial directions of two axes defined by the surface to divide the object area into meshes each defined by four points and calculate, for each of the respective meshes, position information, gradient information, and color information for each vertex of a mesh.

8. A non-transitory computer-readable storage medium storing a computer program for causing a computer to function as units of an image processing apparatus defined in claim 7.

9. An image processing apparatus, comprising:
a unit which extracts an area of an object, as an object area, from an image;
a division unit which divides the object area into a plurality of meshes and calculates, for each of the respective meshes, position information, gradient information, and color information for each vertex of the mesh;
a decision unit which decides unnecessary vertices based on a difference between color information of the respective meshes and color information in areas, in the object area, corresponding to the respective meshes; and
a calculation unit which sets, as necessary vertices, vertices other than the unnecessary vertices, and decides position information, gradient information, and color information of the necessary vertices by performing iterative calculations to change the position information, gradient information, and color information of the necessary vertices so as to minimize a difference between color information of meshes defined by the unnecessary vertices and color information of areas, in the object area, corresponding to the meshes defined by the unnecessary vertices,
wherein said decision unit includes:
a unit which refers to the respective vertices for each line to specify meshes defined by vertices forming a referred line and vertices forming an adjacent line adjacent to the referred line,
a unit which calculates, for the respective specified meshes, a difference between color information of the specified mesh and color information of an area, in the object area, corresponding to the specified mesh, and calculates an average value of differences calculated for the respective specified meshes, and a unit which, when a maximum average value among calculated average values is not larger than a specified value, decides that vertices belonging to a line for which a minimum average value among the calculated average values is calculated are unnecessary vertices.

10. A non-transitory computer-readable storage medium storing a computer program for causing a computer to function as units of an image processing apparatus defined in claim 9.

11. An image processing apparatus, comprising:
a unit which extracts an area of an object, as an object area, from an image;
a division unit which divides the object area into a plurality of meshes and calculates, for each of the respective meshes, position information, gradient information, and color information for each vertex of the mesh;
a decision unit which decides unnecessary vertices based on a difference between color information of the respective meshes and color information in areas, in the object area, corresponding to the respective meshes, wherein said decision unit refers to the respective vertices for each line to specify meshes defined by vertices forming a referred line and vertices forming an adjacent line adjacent to the referred line, and decides the unnecessary vertices on the basis of the calculated difference; and a calculation unit which sets, as necessary vertices, vertices other than the unnecessary vertices, and decides position information, gradient information, and color information of the necessary vertices by performing iterative calculations to change the position information, gradient information, and color information of the necessary vertices so as to minimize a difference between color information of meshes defined by the unnecessary vertices and color information of areas, in the object area, corresponding to the meshes defined by the unnecessary vertices,
wherein said decision unit includes
a unit which refers to the respective vertices for each line to specify meshes defined by vertices forming a referred line and vertices forming an adjacent line adjacent to the referred line, and a unit which calculates, for the respective specified meshes, a difference between color information of the specified mesh and color information of an area, in the object area, corresponding to the specified mesh, and the unnecessary vertices on the basis of the calculated difference.

12. A non-transitory computer-readable storage medium storing a computer program for causing a computer to function as units of an image processing apparatus defined in claim 11.

13. An image processing method to be performed by an image processing apparatus, comprising:
extracting an area of an object, as an object area, from an image;
dividing the object area into a plurality of meshes and calculating, for each of the respective meshes, position information, gradient information, and color information for each vertex of the mesh; deciding unnecessary vertices based on a difference between color information of the respective meshes and color information in areas, in the object area, corresponding to the respective meshes, wherein said deciding step includes referring to the respective vertices for each line to specify meshes defined by vertices forming a referred line and vertices forming an adjacent line adjacent to the referred line, and deciding the unnecessary vertices on the basis of the calculated difference; and setting, as necessary vertices, vertices other than the unnecessary vertices, and deciding position information, gradient information, and color information of the necessary vertices by performing iterative calculations to change the position information, gradient information, and color information of the necessary vertices so as to minimize a difference between color information of meshes defined by the unnecessary vertices and color information of areas, in the object area, corresponding to the meshes defined by the unnecessary vertices, wherein said deciding step includes referring to the respective vertices for each line to specify meshes defined by vertices forming a referred line and vertices forming an adjacent line adjacent to the referred line, and calculating, for the respective specified meshes, a difference between color information of the specified mesh and color information of an area, in the object area, corresponding to the specified mesh, and the unnecessary vertices on the basis of the calculated difference.

14. An image processing method to be performed by an image processing apparatus, comprising:

extracting an area of an object, as an object area, from an image;

dividing the object area into a plurality of meshes and calculates, for each of the respective meshes, position information, gradient information, and color information for each vertex of the mesh;

deciding unnecessary vertices based on a difference between color information of the respective meshes and color information in areas, in the object area, corresponding to the respective meshes; and setting, as necessary vertices, vertices other than the unnecessary vertices, and deciding position information, gradient information, and color information of the necessary vertices by performing iterative calculations to change the position information, gradient information, and color information of the necessary vertices so as to minimize a difference between color information of meshes defined by the unnecessary vertices and color information of areas, in the object area, corresponding to the meshes defined by the unnecessary vertices, wherein said deciding step includes:

calculating a center position of the object area, setting, in the object area, two axes that pass through the center position and are perpendicular to each other, thereby dividing the object area into four divided regions by the two axes, setting representative points on boundaries in the respective divided regions to maximize a distance between two representative points on each pair of opposite divided regions, calculating a curve connecting adjacent representative points for each pair of the adjacent representative points, thereby obtaining four curves, calculating a surface, using the four curves, for a region surrounded by the four curves, and sampling points on the surface two-dimensionally in axial directions of two axes defined by the surface to divide the object area into meshes each defined by four points and calculate, for each of the respective meshes, position information, gradient information, and color information for each vertex of the mesh.

15. The method according to claim 14, wherein the curve includes a cubic Bezier spline curve.

16. The method according to claim 14, wherein the surface includes a Coons patch.

17. The method according to claim 14, wherein said calculation unit performs iterative calculation using a Levenberg-Marquardt method.

18. The method according to claim 14, further comprising encoding and managing a calculation result.

19. An image processing method to be performed by an image processing apparatus, comprising:

extracting an area of an object, as an object area, from an image;

dividing the object area into a plurality of meshes and calculates, for each of the respective meshes, position information, gradient information, and color information for each vertex of the mesh;

deciding unnecessary vertices based on a difference between color information of the respective meshes and color information in areas, in the object area, corresponding to the respective meshes; and setting, as necessary vertices, vertices other than the unnecessary vertices, and decides position information, gradient information, and color information of the necessary vertices by performing iterative calculations to change the position information, gradient information, and color information of the necessary vertices so as to minimize a difference between color information of meshes defined by the unnecessary vertices and color information of areas, in the object area, corresponding to the meshes defined by the unnecessary vertices, wherein said deciding step includes:

calculating a center position of the object area, setting, in the object area, two first axes that pass through the center position and are perpendicular to each other, and two second axes obtained by rotating the two first axes by 45° about the center position, thereby dividing the object area into eight divided regions by the four axes, processing for each pair of opposite divided regions to set representative points on boundaries in the opposite divided regions so as to maximize a distance between two representative points on each pair of opposite divided regions and calculating a distance between two representative points on each pair of opposite divided regions, specifying two representative points for which a maximum distance is calculated and two representative points for two divided regions, not adjacent to the two divided regions where the two representative points for which the maximum distance is calculated, are calculated, calculating, for each pair of adjacent representative points specified by said specifying unit, a curve connecting the adjacent representative points, thereby obtaining four curves, calculating a surface, using the four curves, for a region surrounded by the four curves, and sampling points on the surface two-dimensionally in axial directions of two axes defined by the surface to divide the object area into meshes each defined by four points and calculate, for each of the respective meshes, position information, gradient information, and color information for each vertex of a mesh.

20. An image processing method to be performed by an image processing apparatus, comprising:

extracting an area of an object, as an object area, from an image;

dividing the object area into a plurality of meshes and calculates, for each of the respective meshes, position information, gradient information, and color information for each vertex of the mesh;

deciding unnecessary vertices based on a difference between color information of the respective meshes and color information in areas, in the object area, corresponding to the respective meshes; and setting, as necessary vertices, vertices other than the unnecessary vertices, and decides position information, gradient information, and color information of the necessary vertices by performing iterative calculations to change the position information, gradient information, and color information of the necessary vertices so as to minimize a difference between color information of meshes defined by the unnecessary vertices and color information of areas, in the object area, corresponding to the meshes defined by the unnecessary vertices, wherein said deciding step includes:

referring to the respective vertices for each line to specify meshes defined by vertices forming a referred line and vertices forming an adjacent line adjacent to the referred line, calculating, for the respective specified meshes, a difference between color information of the specified mesh and color information of an area, in the object area, corresponding to the specified mesh, and calculating an average value of differences calculated for the respective specified meshes, and deciding, when a maximum average value among calculated average values is not larger than a specified value, that vertices belonging to a line for which a minimum average value among the calculated average values is calculated are unnecessary vertices.

* * * * *